United States Patent [19]

Zornes

[11] Patent Number: 5,040,906
[45] Date of Patent: Aug. 20, 1991

[54] BEARING WITH LUBRICATING AND NON-LUBRICATING SPACER ELEMENTS

[75] Inventor: David A. Zornes, Redmond, Wash.

[73] Assignee: Balanced Engines, Inc., Tacoma, Wash.

[21] Appl. No.: 503,526

[22] Filed: Apr. 2, 1990

[51] Int. Cl.⁵ .................... F16C 19/40; F16C 33/66
[52] U.S. Cl. .................................. 384/551; 384/470
[58] Field of Search ............. 384/551, 572, 470, 463, 384/520, 51

[56] References Cited

U.S. PATENT DOCUMENTS

| | | | |
|---|---|---|---|
| 260,585 | 7/1882 | Marston | 384/551 |
| 825,956 | 7/1906 | Bowie | 384/551 |
| 1,209,537 | 12/1916 | Atkins | 384/520 |
| 3,208,806 | 9/1965 | Grolmann | 384/520 |
| 3,790,239 | 2/1974 | Laux et al. | 384/463 |
| 4,500,144 | 2/1985 | de Campos | 384/463 |
| 4,906,110 | 3/1990 | Van Wyk et al. | 384/551 |

*Primary Examiner*—Thomas R. Hannon
*Attorney, Agent, or Firm*—Seed and Berry

[57] ABSTRACT

A bearing has rolling elements separated by floating spacer elements. Some of the floating spacer elements provide solid lubricant for lubricating the bearing. Other floating spacer elements may be non-lubricating. The lubricant-providing elements are alternated with the non-lubricating elements to maintain the alignment and spacing of the rolling elements, thereby promoting proper operation of the bearings throughout the life of the lubricant.

6 Claims, 3 Drawing Sheets

BEARING WITH LUBRICATING AND NON-LUBRICATING SPACER ELEMENTS

DESCRIPTION

1. Technical Field

This invention relates to self-lubricating bearings of the type in which the roller elements are lubricated by lubricant transfer from spacers containing lubricants.

2. Background of the Invention

U.S. Pat. No. 4,906,110 discloses an improved solid lubricant roller bearing in which the rollers are separated by floating lubricating spacers. The spacers may comprise spacer elements placed end-to-end. The present invention aims to reduce the cost of such bearings for certain applications without reduction in performance and life.

SUMMARY OF THE INVENTION

In accordance with the present invention, only alternate elements of the spacers between the rollers provide solid lubricant for the rollers; the remaining spacer elements primarily have only a spacing function, although they may be of a material such as Teflon®, which has favorable anti-friction characteristics. The latter non-lubricating elements are preferably alternated with the lubricating spacer elements in an arrangement placing each non-lubricating spacer element opposite a lubricating spacer element so that the entire length of the rollers is lubricated by direct contact with the lubricating spacer elements as the roller turns. The non-lubricating spacers assist in spreading the lubricant on the rollers and substantially contribute to roller stability when the lubricating spacer elements wear such that the tolerance between the rollers and the lubricating spacer elements exceeds the tolerance between the rollers and the non-lubricating spacers. In the preferred arrangement each roller has a pair of non-lubricating spacers adjacent its ends at one side of the roller and has a central non-lubricating spacer opposite its other side. Each roller may comprise multiple roller elements placed end-to-end and may be ceramic.

DETAILED DESCRIPTION OF THE INVENTION

Figure 1:
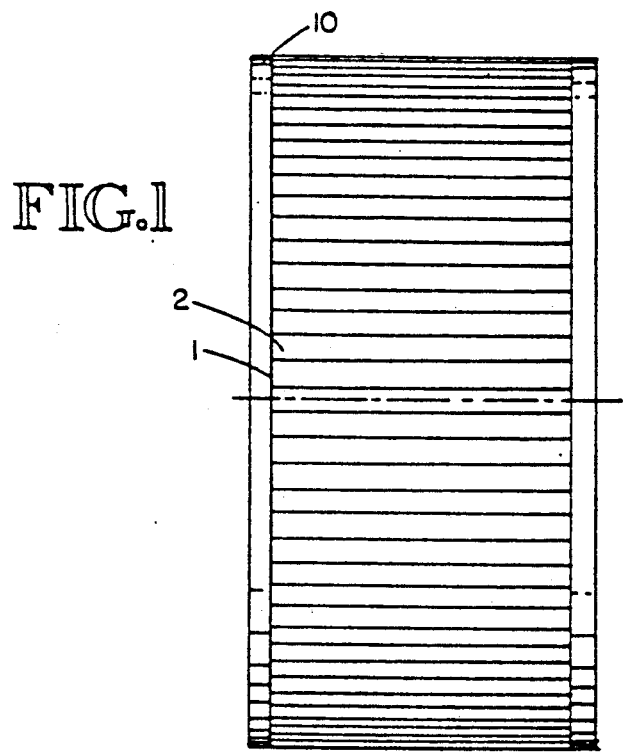
FIG. 1 is an exterior side view of a typical assembly of spacer and roller elements to which the invention is applicable.
Figure 2:
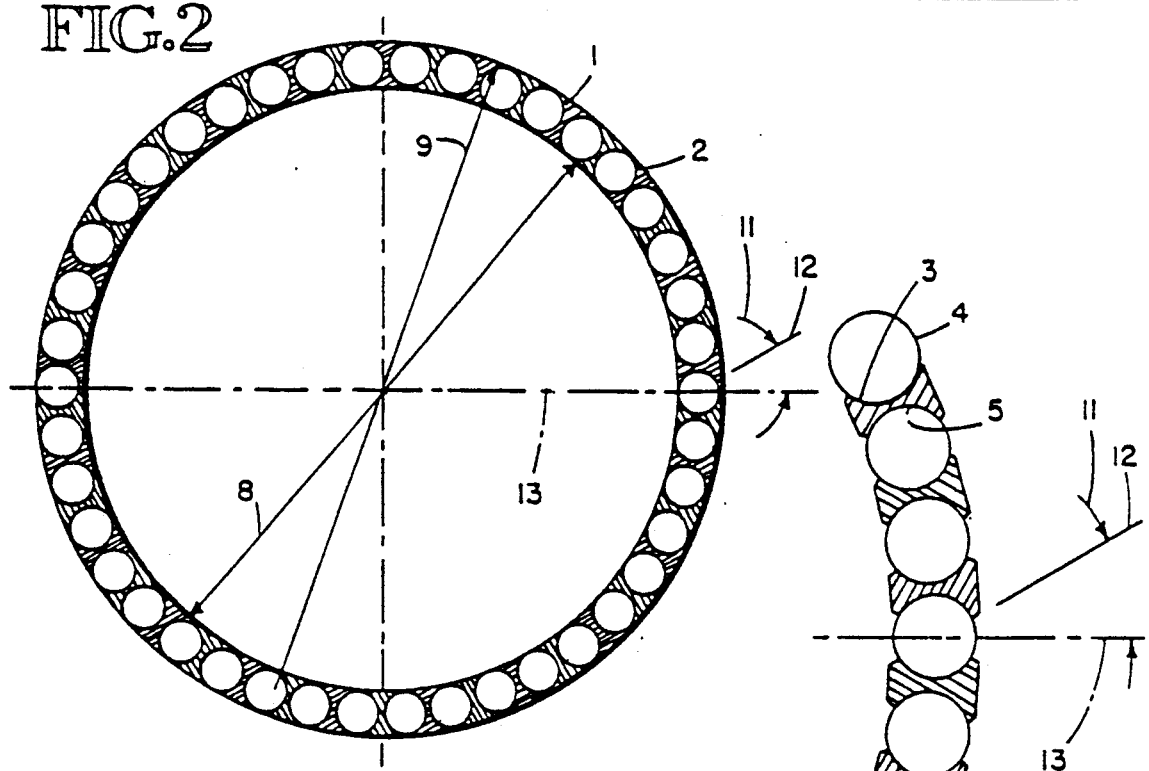
FIG. 2 is an end view of the assembly with an annular end ring removed.

Referring to FIGS. 1-2, floating spacers 1 having a solid lubricant composition separate an equal number of rolling needle elements 2. Each spacer 1 is machined or molded to provide concave opposite sides 3, 5 with a curvature matching the outer surface 4 of the needle rolling elements 2 to provide a large contact area for solid lubricant transfer and to minimize the unit pressure at the roller/spacer contact, thereby minimizing the wear of the spacer 1. The outer and inner surfaces 6, 7 of the spacers 1 may be molded or machined with a convex curvature to conform, respectively, to that of the inner and outer raceways, as determined by diameters 8, 9, or the surfaces 6, 7 may be planar and have two-line contact along the longitudinal edges of outer surface 6 with the outer raceway and single-line tangential contact with the inner raceway midway between the longitudinal side edges of inner surface 7. End lubrication of the rolling elements 2 may be accomplished, for example, by annular rings 100 of solid lubricant material positioned adjacent the ends of the rollers 2 and spacers 1, or by end caps of solid lubricant material mounted on the ends of the rollers, or by end portions of the spacers arranged to overlap the ends of the rollers.

After the spacers 1 have been formed they may be machined to exact dimensions. However, for cost reduction it is preferred to be able to avoid a machining step. This result can be accomplished if the spacers each comprise a series of relatively short spacer elements placed end-to-end, because such spacer elements can be formed to the necessary tolerances solely by a high-pressure compaction and secondary sintering procedure without need for follow-up machining. It is preferred that the joints at the meeting ends of adjoining spacer elements at opposite sides of each roller be staggered endwise of the roller, so that each portion of the roller circumference will directly contact a spacer element during each roller rotation. This end can be accomplished, for example, by beveling the adjoining ends of the spacers to provide sloped end faces. By this arrangement the joint lines between respective spacer elements at opposite sides of a roller are staggered relative to one another along the roller.

Figure 3:
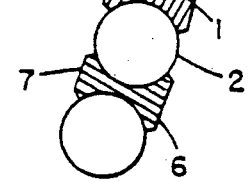
FIG. 3 is a detailed end view taken as in FIG. 2.

Referring to FIG. 3, a recess 10 with angle 11 is preferably provided in the spacer elements along a plane 12 passing through the center axis of the adjoining rolling elements 2. This recess angle 11, as measured with respect to a plane 13 passing through the rotary axis of the bearing and the rotary axis of the adjoining rolling element, typically has a value of 30 degrees and will ensure that wear particles separated from the spacer are of minimum size so as not to interfere with the smooth operation of the bearing. The recess also serves to recapture small, loose wear particles of transfer lubricant and consolidate the particles back into the body of the spacer under the compressive action occurring between the rolling elements and the spacer with respect to the apex of the recess angle 11.

Figure 6:
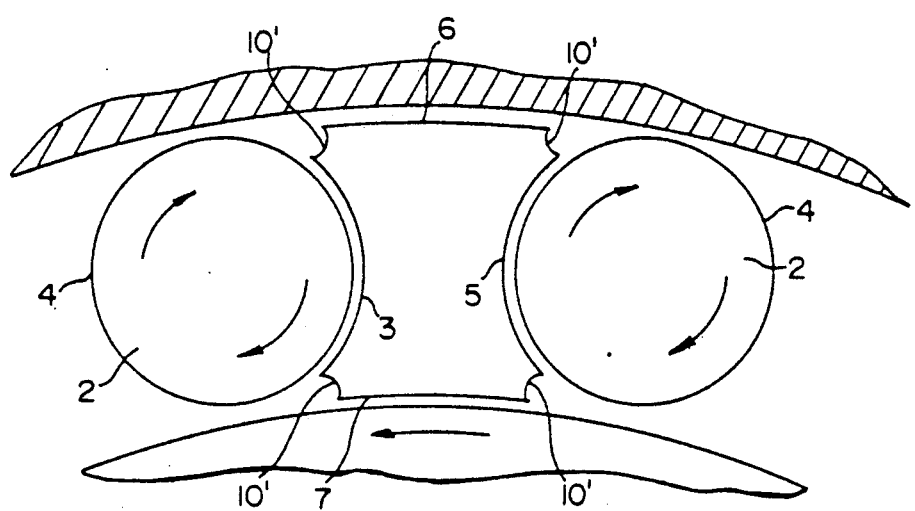
FIG. 6 is an alternate embodiment of a spacer for use with the rollers.

In an alternate embodiment of the spacer element 10, shown in FIG. 6, the recesses 10' are relieved so as to be substantially concave. This modification encourages wear particles to be captured in the recesses 10' rather than becoming entrapped between relative moving surfaces of the assembly.

In accordance with the present invention, it is also preferred for certain bearing installations to not only segment the spacers, but to alternate spacer elements containing solid lubricant substances ("lubricating spacer elements") with spacer elements which do not have self lubrication as their principal function ("non-lubricating spacer elements") and preferably are more resistant to wear from roller contact. The lubricating and non-lubricating spacer elements are preferably alternated in both the axial roller direction and circumferential direction of rotation of the entire bearing assembly. This structural arrangement maintains the original alignment and spacing of the roller elements as the lubricating spacer segments are consumed. The life of the bearing assembly is therefore improved and skewing of the rolling needle elements is prevented. Suitable materials for the "non-lubricating" spacer elements include, but are not limited to such hard wearing materials as ceramic materials, non-lubricated polymide materials, steel, silver impregnated bronze, phenolic materials, nylon, etc. The "non-lubricating" spacer elements may also be made co from relatively soft materials such as Teflon ®, phenolic materials, nylon, etc. for low load conditions.

Figure 4:
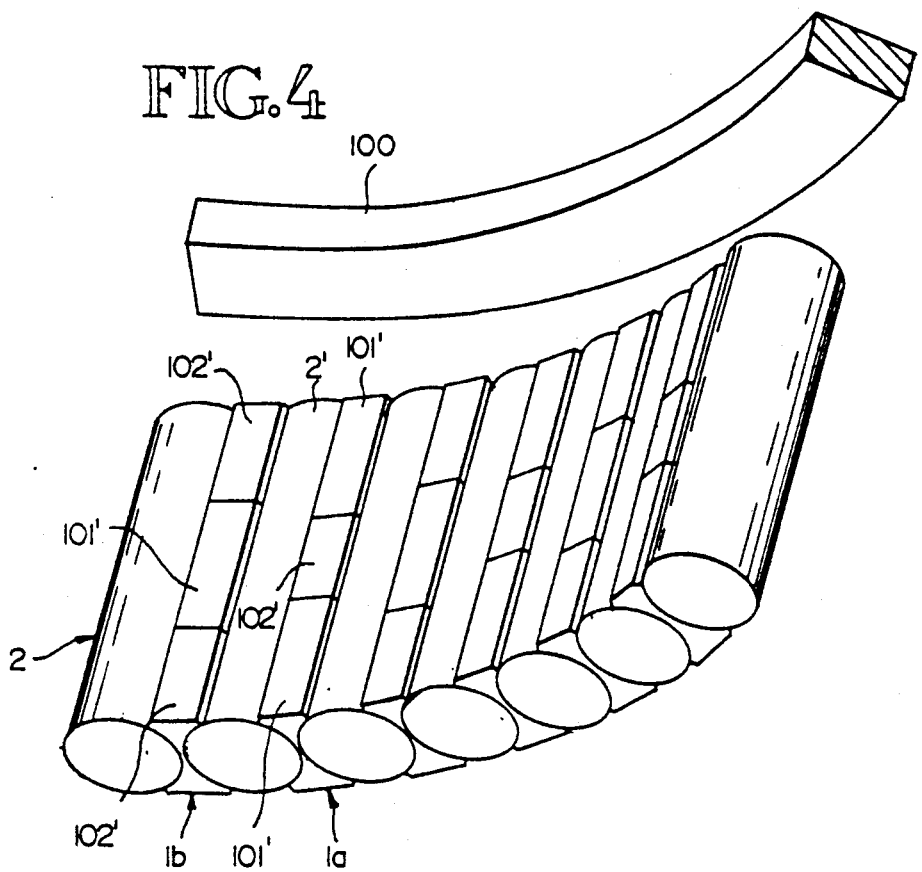
FIG. 4 is an isometric exploded view of a portion of a bearing constructed in accordance with the present invention.

A basic arrangement of lubricating and non-lubricating spacer elements denoted 101 and 102, respectively, is shown in FIG. 4 for adjacent spacers. Spacer 1a, for example, has a pair of lubricating spacer elements 101 separated by a non-lubricating spacer element 102, whereas spacer 1b has a pair of non-lubricating spacer elements 102' separated by a lubricating spacer element 101'. Each of the lubricating spacer elements are preferably larger than the non-lubricating spacer elements so that the full length of the related roller will always be in contact with lubricating spacer elements The illustrated arrangement of alternating lubricating and non-lubricating spacers in FIG. 4 provides each roller (roller 2', for example) with two non-lubricating roller elements 102' adjacent its ends at one side of the roller, and with a central non-lubricating roller 102 at the other side of the roller. This provides stability to the roller by the non-lubricating spacers in the event that the lubricating spacers experience appreciably greater wear than the non-lubricating spacers.

Figure 5:
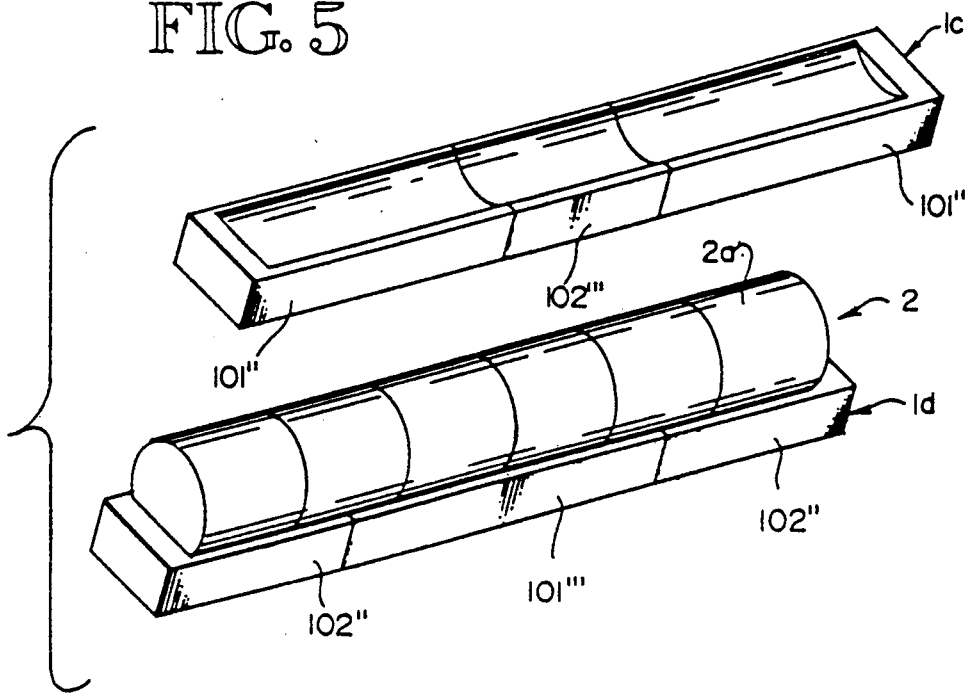
FIG. 5 is an exploded isometric view of a preferred spacer and roller configuration.

Referring to FIG. 5, the spacer 1c can provide end lubrication for the roller 2 by having the spacer ends cover the ends of the cavity with which the rollers interfit. Also, the rollers 2 can comprise a series of roller elements 2a placed end-to-end. As in the FIG. 4 example, non-lubricating spacer elements are alternated with lubricating spacer elements. At one side of the roller 2 spacer 1c has a pair of lubricating spacer elements 101" which are opposed by a shorter pair of non-lubricating spacer elements 102" in spacer 1d at the other side. Further, in spacer 1d center lubricating spacer element 101'" opposes a central non-lubricating spacer 102'" in spacer 1c.

In the embodiments shown in FIGS. 4 and 5, the spacers 1a-1d have been shown as each consisting of three spacer elements. It will be understood that there can be a greater number of spacer elements in each spacer, preferably an odd number of elements in each which are arranged so that (a) lubricating spacer elements alternate with non-lubricating elements in each spacer, and (b) lubricating spacer elements in each spacer are positioned opposite a non-lubricating spacer element in the adjacent spacers.

The lubricating spacer elements may be made from Vespel ® SP-21 polymide, a commercially available product produced by the DuPont Company having U.S. Military Specification R46198. This product does not soften and is thermally resistant such that it can carry loads at temperatures beyond the reach of most plastic materials and do so while exhibiting very low creep. For example, when the product is subjected for 100 hours to loads of 2,500 psi at 572° F., the total deformation is only 1.2%. At the end of 600 hours under these load and temperature conditions the total deformation only increases to 1.6%. Vespel ® SP-21 has a polymide matrix containing a dispersion of various solid lubricant substances such as graphite and Teflon ®. The lubricating spacer elements are made by high-pressure compaction of Vespel ® powder and secondary sintering. The highest strength and lowest thermal expansion are usually found in the direction perpendicular to the pressing direction. Vespel ® SP-21 may be used for spacer elements to be used at lower temperatures. Preferably, there is initially less tolerance between the lubricating spacer elements and the rollers than between the non-lubricating spacers and the rollers. After use has commenced, the lubricant from the lubricating spacer elements spreads over the rollers and the non-lubricating spacer elements.

Although I have shown and described specific embodiments of my invention, it will be apparent that many minor changes of structure and operation could be made without departing from the spirit of the invention as defined by the scope of the appended claims.

I claim:

1. A bearing comprising:
   rollers; and
   floating spacers separating the rollers, said spacers each comprising lubricating spacer elements and non-lubricating spacer elements placed end-to-end in alternating order, there being a total of at least three spacer elements in each spacer, and the alternating order of lubricating and non-lubricating elements in each spacer being staggered relative to such alternating order int he two adjacent spacers so that each roller has lubricating spacer elements from its two adjoining spacers collectively in contact with the full two adjoining spacers collectively in contact with the full length thereof.

2. A bearing according to claim 1 in which each lubricating spacer element in each spacer adjoins one or two non-lubricating spacer elements in such spacer.

3. A bearing according to claim 1 in which said lubricating spacer elements are longer than said non-lubricating spacer elements.

4. A bearing according to claim 1 in which said non-lubricating spacer elements are of a wear-resistant material.

5. A bearing comprising:
   means providing a raceway;
   a plurality of rollers in said raceway;
   a first set of roller-lubricating spacer elements in said raceway between said rollers and contacting the entire length of said rollers;
   and a second set of non-lubricating wear-resistant spacer elements in said raceway between said rollers and alternating with said first set.

6. A bearing according to claim 5 in which said raceway is circular, and in which said second set alternates with said first set circumferentially of said raceway.

* * * * *

UNITED STATES PATENT AND TRADEMARK OFFICE
CERTIFICATE OF CORRECTION

PATENT NO. : 5,040,906
DATED : August 20, 1991
INVENTOR(S) : David A. Zornes

It is certified that error appears in the above-identified patent and that said Letters Patent is hereby corrected as shown below:

Column 4, claim 1, line 36, please delete "int he" and substitute therefor -- in the --.

Column 4, claim 1, lines 39 and 40, after "full" please delete the repeated phrase "two adjoining spacers collectively in contact with the full".

Signed and Sealed this

Twenty-ninth Day of December, 1992

Attest:

DOUGLAS B. COMER

*Attesting Officer*     Acting Commissioner of Patents and Trademarks